_Patented Apr. 1, 1952_

2,591,105

UNITED STATES PATENT OFFICE 2,591,105

EXOTHERMICALLY REACTING SLEEVE FOR RISERS

Kossy Strauss and Ronald F. Boddey, Birmingham, England, assignors to Foundry Services Limited, Nechells, Birmingham, England, a British company No Drawing. Application August 6, 1948, Serial No. 43,014. In Great Britain August 19, 1947

11 Claims. (Cl. 22—147)

The present invention concerns improvements in or relating to heat producing mixtures containing aluminum and one or more oxidising agents.

The object of the invention is to provide a heat producing agent which is controlled both as regards the time taken for the heat producing reaction to start and the rate of the reaction.

According to the invention small amounts of fluoride e. g. a metal fluoride or double fluoride preferably an alkali fluoride such as sodium fluoride or cryolite or potassium aluminum fluoride or mixtures of sodium fluoride and cryolite or potassium aluminum fluoride are added to the mixture of aluminum and an oxidising agent with or without the presence of other substances. The presence of fluoride will facilitate the start of the heat producing reaction. It will cause the reaction to start at a lower temperature than without the presence of fluoride and once the reaction has started the presence of fluoride will facilitate maintaining the reaction in a quiet way up to the completion of the reaction.

The amount of fluoride added may vary from 1% to 5% by weight of the heat producing mixture itself. If 1% is added the time for the reaction to start is prolonged and takes approximately three minutes and the rate of reaction, i. e. the rate at which heat is produced, is comparatively slow and steady. If 5% of fluoride is added the time to start the reaction is rapid and probably less than one minute, and the rate of the reaction is rapid, proceeding under development of intense heat, but the reaction is steady and at no time violent.

A further factor to be taken into consideration in determining the time taken for the reaction to start and the rate of reaction is, in addition to the amount of fluoride present, the ratio of aluminum to oxidising agent and the ratio of aluminum and oxidising agent to inert matter (such as grog or alumina).

Mixtures according to the present invention are to be embodied in shaped articles for the purpose of delaying solidification of the molten metal in places where the metal is desired to solidify last, such as runners and risers and feeding heads of castings, in which case the proportion of fluoride and the ratio of aluminum to oxidising agent and the ratio of aluminum and oxidising agent to inert material is selected in accordance with the metal to be used and the particular purpose the shaped article is to be used for and the conditions in which it is to be used.

A heat producing mixture including magnesium as well as aluminum may be employed. To this heat producing mixture fluorides according to the present invention can be added while it has been found that if a suitable amount of fluoride is employed the magnesium may be eliminated.

Again the heat producing mixtures according to the invention may be embodied in shaped articles or be in powdered form. Generally it will be of advantage to employ shaped articles and heat producing powder simultaneously.

A large number of mixtures have been tested and found satisfactory.

Common to all these mixtures are aluminum, an oxidising agent, a fluoride and refractory material.

The preferred composition of mixtures lies within the ranges set out below:

| | Per cent |
|---|---|
| Aluminum in divided form such as a mixture of powder and sawings | 30–50 |
| Sodium nitrate | 0–10 |
| Manganese dioxide or iron oxides or a mixture of both | 5–20 |
| Alkali fluorides or alkali-aluminum fluorides | 1– 5 |
| Bentonite | 0– 2 |
| Core gum (if shaped articles are used to act as binder) | 2– 7 |
| Granulated grog or moulding sand | Remainder. |

It will be seen from above that bentonite may or may not be used. Also manganese dioxide can be used alone or iron oxides or mixtures of both. Sodium nitrate may or may not be used. Grog may be used or alternatively ordinary moulding sand (silica sand).

The following are examples of mixtures found satisfactory for specific purposes.

Example 1

In connection with the production of steel castings where a high temperature is required a mixture having the following composition gives excellent results:

| | Per cent |
|---|---|
| Aluminum in form of a mixture of fine aluminum powder and aluminum sawings | 50 |
| Sodium nitrate | 7 |
| Manganese dioxide or iron oxide or a mixture of both | 10 |
| Alkali fluoride or alkali aluminum fluoride such as potassium aluminum fluoride or cryolite | 3 |
| Granulated grog | 23 |
| Bentonite (for improving the green strength of the shaped article) | 2 |
| Core gum (as binder for producing shaped articles) | 5 |

This mixture is sufficiently wetted with water and thoroughly mixed and rammed into shape according to ordinary foundry practice. The shape can be an ordinary cylindrical body in the form of a sleeve which can be moulded into the sand mould forming a channel through which the metal flows and which will keep the metal contained in the whole of the sleeve liquid for a considerable time. It is an advantage to cover the metal in the sleeve with heat producing mixture in powdered form of the same composition as above, omitting the bentonite and core gum which are only necessary for producing shaped articles.

Example 2

For copper and copper alloys where the temperature of the metal is not as high as for steel, a mixture which starts the reaction at a somewhat lower temperature than for Example 1 should be employed. The following composition gives good results:

|  | Per cent |
|---|---|
| Aluminum in the form of a mixture of fine aluminum powder and aluminum sawings | 50 |
| Sodium nitrate | 7 |
| Manganese dioxide or iron oxide or a mixture of both | 10 to 15 |
| Bentonite | 2 |
| Alkali fluoride or alkali aluminum fluoride such as potassium aluminum fluoride or cryolite | 5 |
| Core gum | 5 |
| Granulated grog or other refractory materials | Remainder. |

It is obvious that the invention is not confined to the use of the oxidising agents mentioned above but that one or a mixture of a number of oxidising agents can be employed and that the time of starting the reaction and the rate at which the reaction proceeds can be varied within very wide limits according to the amount and the type of oxidising material employed.

Example 3

In the case of aluminum and aluminum alloys the temperature of the metal may not be sufficient to initiate the reaction. In this case it is only necessary to apply heat to one point of the heat producing shape or the heat producing powder by means of a gas torch or a blow lamp and the reaction will continue from this point without further application of heat.

A mixture which will start the reaction when it comes into contact with the hot aluminum and so avoid the necessity of applying heat specially as indicated in the preceding paragraph has been found to fall within the limits set out above and a typical composition is as follows:

|  | Per cent |
|---|---|
| Aluminum powder | 50 |
| Moulding sand | 27 |
| Sodium nitrate | 10 |
| Alkali fluoride or alkali aluminum fluoride such as potassium aluminum fluoride or cryolite | 5 |
| Iron oxide | 5 |
| Core gum | 3 |

In mixtures making use of aluminum sawings it is found that the size of the sawings is rather critical and the time taken for the reaction to start is dependent to some extent on it. Satisfactory results can be obtained with aluminum sawings which pass through a 20 mesh sieve, but further gradings may be found desirable.

Having thus described the invention, what is claimed as new and desired to be secured by Letters Patent, is:

1. A substantially sleeve-shaped article adapted for contact with molten metal used in the production of castings and molded from a heat producing mixture consisting essentially of aluminum, an oxidizing agent containing a substantial amount of a member selected from the group consisting of iron oxide and manganese dioxide, the amount of said agent being substantially below that needed to react with the aluminum to oxidize it completely, and 1 to 5% by weight of a fluoride compound selected from the group consisting of sodium fluoride, potassium fluoride, cryolite and potassium aluminum fluoride to facilitate the burning of the aluminum with oxygen derived from the atmosphere and to lower the temperature at which reaction starts.

2. An article according to claim 1, in which said fluoride compound is sodium fluoride.

3. An article according to claim 1, in which said fluoride compound is potassium aluminum fluoride.

4. An article according to claim 1, in which said fluoride compound consists of a mixture of sodium fluoride and potassium aluminum fluoride.

5. A substantially sleeve-shaped article adapted for contact with molten metal used in the production of castings and molded from a heat producing mixture comprising Aluminum in powder form, from about 30% to 50%
Sodium nitrate, up to 10%
An oxidising agent in the form of manganese dioxide, from about 5% to 20%
Alkali aluminum fluoride, from about 1% to 5%
Refractory material in the form of molding sand constituting the remainder.

6. A substantially sleeve-shaped article adapted for contact with molten metal used in the production of steel castings, and molded from a heat producing mixture comprising

|  | Per cent |
|---|---|
| Aluminum in the form of a mixture of fine aluminum powder and aluminum sawings | 50 |
| Sodium nitrate | 7 |
| An oxidising agent in the form of manganese dioxide | 10 |
| Alkali aluminum fluoride | 3 |
| Refractory material in the form of molding sand constituting the remainder. | |

7. A substantially sleeve-shaped article adapted for contact with molten metal used in the production of castings of copper and copper alloys, and molded from a heat producing mixture comprising Aluminium in the form of a mixture of fine aluminium powder and aluminium sawings, 50%
Sodium nitrate, 7%
Manganese dioxide, from about 10% to 15%
Alkali aluminium fluoride, 5%
Molding sand forming the remainder.

8. A substantially sleeve-shaped article adapted for contact with molten metal used in the production of castings of aluminum and aluminum alloys and molded from a heat producing mixture comprising

| | Per cent |
|---|---|
| Aluminium powder | 50 |
| Sodium nitrate | 10 |
| Alkali aluminium fluoride | 5 |
| Iron oxide | 5 |
| Molding sand | Remainder |

9. A sleeve-shaped article adapted for contact with molten metal used in the production of steel castings and consisting of the following approximate amounts:

| | Per cent |
|---|---|
| Aluminium in form of a mixture of fine aluminium powder and aluminium sawings | 50 |
| Sodium nitrate | 7 |
| An oxidising agent selected from the group consisting of iron oxide and manganese dioxide | 10 |
| Alkali aluminium fluoride | 3 |
| Bentonite | 2 |
| Core gum | 5 |

Refractory material forming the remainder.

10. A sleeve-shaped article adapted for contact with molten metal used in the production of castings of copper and copper alloys and consisting of the following approximate amounts:

Aluminium in the form of a mixture of fine aluminium powder and aluminium sawings, 50%
Sodium nitrate, 7%
An oxidising agent in the form of manganese dioxide, from about 10% to 15%
Alkali aluminium fluoride, 5%
Bentonite, 2%
Core gum, 5%
Refractory material in the form of molding sand forming the remainder.

11. A sleeve-shaped article for contact with molten metal used in connection with the production of aluminium and aluminium alloys consisting of the following approximate amounts:

| | Per cent |
|---|---|
| Aluminium powder | 50 |
| Sodium nitrate | 10 |
| Alkali aluminium fluoride | 5 |
| Iron oxide | 5 |
| Core gum | 3 |

Molding sand forming the remainder.

KOSSY STRAUSS.
RONALD F. BODDEY.

REFERENCES CITED

The following references are of record in the file of this patent:

UNITED STATES PATENTS

| Number | Name | Date |
|---|---|---|
| 2,162,938 | Comstock | June 20, 1939 |
| 2,282,175 | Emerson | May 5, 1942 |
| 2,295,227 | Mackett | Sept. 8, 1942 |
| 2,370,610 | Adeline | Feb. 27, 1945 |
| 2,490,327 | Soffel | Dec. 6, 1949 |

FOREIGN PATENTS

| Number | Country | Date |
|---|---|---|
| 8,642 | Great Britain | of 1915 |
| 532,243 | Great Britain | Jan. 21, 1941 |
| 565,154 | Great Britain | Oct. 30, 1944 |
| 581,888 | Great Britain | Oct. 29, 1946 |
| 589,684 | Great Britain | June 26, 1947 |
| 814,594 | France | Mar. 22, 1937 |